United States Patent [19]

Moriya

[11] 4,148,232
[45] Apr. 10, 1979

[54] OIL PRESSURE CONTROL MEANS FOR AN AUTOMATIC TRANSMISSION

[75] Inventor: Shigeru Moriya, Toyota, Japan

[73] Assignee: Toyota Jidosha Kogyo Kabushiki Kaisha, Japan

[21] Appl. No.: 791,578

[22] Filed: Apr. 27, 1977

[30] Foreign Application Priority Data

Dec. 29, 1976 [JP] Japan .................. 51-159962

[51] Int. Cl.² ........................................... B60K 41/10
[52] U.S. Cl. ........................................ 74/869; 74/867; 74/865; 74/752 C
[58] Field of Search ............. 74/781 R, 867, 868, 74/869, 863, 864, 865; 335/208

[56] References Cited

U.S. PATENT DOCUMENTS

| 4,036,082 | 7/1977 | Onuma | 74/781 R |
| 4,036,626 | 7/1977 | Udagawa | 74/857 |

FOREIGN PATENT DOCUMENTS 2359581  7/1974  Fed. Rep. of Germany .......... 335/208

Primary Examiner—Samuel Scott
Assistant Examiner—G. A. Anderson
Attorney, Agent, or Firm—Stevens, Davis, Miller & Mosher

[57] ABSTRACT

An oil pressure control means for operating an automatic transmission for automobiles in a manner to establish various speed shift stages in accordance with the balance of the throttle pressure and the governor pressure, including a combination of a thermo-sensitive control means operable in response to the engine temperature and an oil passage change-over means, said combination being adapted to supply the line pressure in lieu of the throttle pressure to a speed shift valve which establishes the highest speed stage when the engine is not yet warmed up thereby positively shifting the speed shift valve to the lower speed shift position by overbalancing the governor pressure by the line pressure.

7 Claims, 3 Drawing Figures

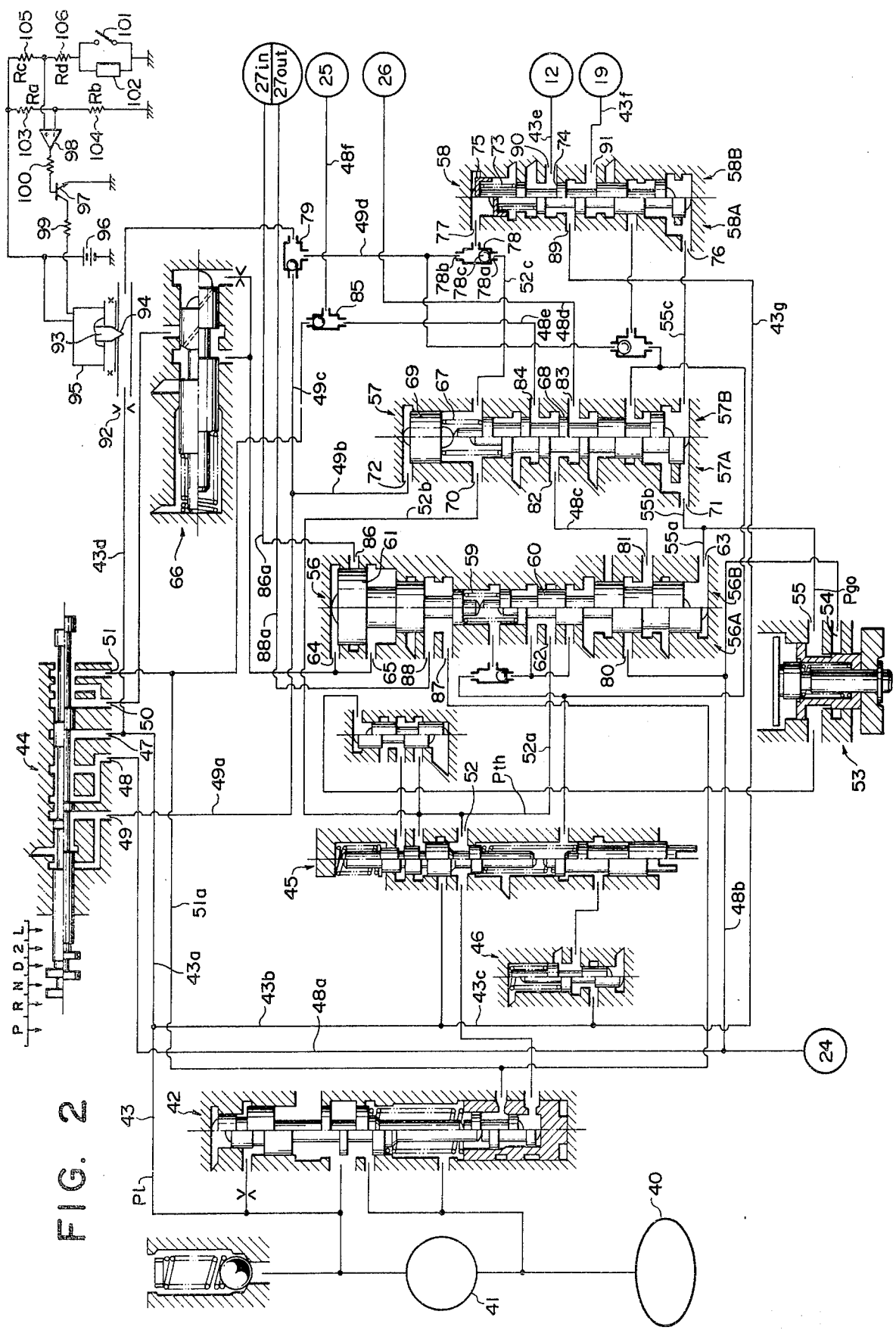

OIL PRESSURE CONTROL MEANS FOR AN AUTOMATIC TRANSMISSION

BACKGROUND OF THE INVENTION

1. Field of the Invention:

The present invention relates to an oil pressure control means for an automatic transmission for automobiles and, more particularly, an improvement of such an oil pressure control means with regard to the speed shift performance when the engine is in a cold state before warming up.

2. Description of the Prior Art:

In the automatic transmission comprising a fluid torque converter and a reduction gear means including a reduction gear mechanism and a plurality of friction engaging means, the operation of the friction engaging means is changed over in various manner in accordance with the variation of the running condition of the vehicle to constantly establish the most desirable speed shift stage for the running condition of the vehicle. The changing over control of the friction engaging means is effected by an oil pressure control means which incorporates speed shift valves each being adapted to shift between two shift positions depending upon the balance of the throttle pressure which varies in accordance with the amount the accelerating pedal is pushed or the opening of the throttle valve and the governor pressure which varies in accordance with the vehicle speed so that the reduction gear means is set at a selected desirable speed stage depending upon the balance of the throttle pressure and the governor pressure, i.e. the balance of the amount the accelerating pedal is pushed and the vehicle speed. Therefore, even when the accelerating pedal is pushed for a constant amount, if the vehicle speed at the instant is relatively low, the throttle pressure is relatively higher than the governor pressure in view of the contrast therebetween, whereby the reduction gear means is set at a lower speed stage, whereas if the vehicle speed is relatively high, the throttle pressure is relatively lower than the governor pressure in view of the contrast therebetween, whereby the reduction gear means is set at a higher speed stage. In the conventional automatic transmission wherein the speed stage of the reduction gear means is selected depending upon the balance or contrast of the throttle pressure and the governor pressure, it happens that the reduction gear means is set at a higher speed stage even when the vehicle speed is relatively low, if the amount the accelerating pedal is pushed is also so small that the throttle pressure is also sufficiently low relative to the low governor pressure at the relatively low vehicle speed. Particularly when an overdrive means is incorporated in the automatic transmission, it happens that the transmission operates in the overdrive condition even in a low speed operation of the vehicle.

It does not cause any serious problem that the vehicle is operated at a low speed in a high speed gear such as the overdrive stage if the engine is in the warmed up condition. However, if the engine is operated in a high speed gear before it is warmed up, there occur problems such as the increase of the fuel consumption and the increase of the emission of noxious components, particularly NOx in the exhaust gases.

SUMMARY OF THE INVENTION

It is therefore the object of the present invention to deal with the aforementioned problems and to provide an improved oil pressure control means which controls the automatic transmission in a manner such that the transmission is restricted from being shifted to the higher speed stage before it has been warmed up.

In accordance with the present invention, the above-mentioned object is accomplished by an oil pressure control means for an automatic transmission which comprise a fluid torque converter and a speed shift gear means including a speed shift gear mechanism and a plurality of friction engaging means, said oil pressure control means comprising a source of oil pressure, a line pressure regulating valve which generates a line pressure from the oil pressure of said source, a throttle pressure regulating valve which generates a throttle pressure corresponding to the throttle opening, a governor valve which generates a governor pressure corresponding to the vehicle speed, a manual shift valve for shifting speed ranges, a plurality of speed shift valves which change over the supply of oil pressure to said friction engaging means of said reduction gear means depending upon the balance of said throttle pressure and said governor pressure, a thermo-sensitive control means including a thermo-sensitive element for sensing the engine temperature and adapted to be conductive for the line pressure therethrough when the engine temperature is below a predetermined value and to be substantially interceptive for the line pressure thereacross when the engine temperature is above a predetermined value, and an oil passage change-over means which supplies the line pressure conducted through said thermo-sensitive control means to one of said speed shift valves which establishes the highest speed stage in lieu of the throttle pressure when the said thermo-sensitive control means is conductive.

BRIEF DESCRIPTION OF THE DRAWING

In the accompanying drawing,

FIG. 2 is a diagram showing an embodiment of the oil pressure control means of the present invention for controlling the automatic transmission shown in FIG. 1; and, FIG. 3 is a sectional view showing an embodiment of the thermo-sensitive switch.

DESCRIPTION OF THE PREFERRED EMBODIMENT

Figure 1:
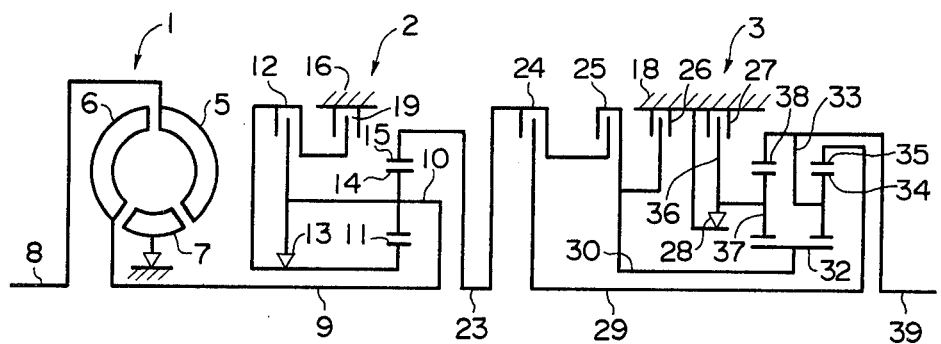
FIG. 1 is a diagrammatical view showing an embodiment of the automatic transmission in which the present invention is incorporated.

In FIG. 1, an example of the automatic transmission incorporating an overdrive means is shown in the form of a diagram for the purpose of simplicity. However, if the more concrete structure of the transmission is required, reference should be made to the specifications and drawings of co-pending patent applications Ser. Nos. 791,575, 791,576, and 791,577, all filed Apr. 27, 1977, all being assigned to the same assignee as the present application. The automatic transmission herein shown comprises a fluid torque converter 1, an overdrive means 2, reduction gear means 3 for effecting three forward speed stages and one rearward speed stage and is adapted to be controlled by the oil pressure control means shown in FIG. 2. The fluid torque converter 1 is of the conventional well known type including a pump impeller 5, a turbine 6 and a stator 7. The pump impeller 5 is connected with a crank shaft 8 of the engine (not shown) while the turbine 6 is connected with a turbine shaft 9 which forms an output shaft of the fluid torque converter. This output shaft also provides an input shaft of the overdrive means 2, wherein the input shaft is connected with a carrier 10 of a planetary gear mechanism incorporated in the overdrive means. The carrier 10 rotatably supports a plurality of planetary pinions 14 which in turn are engaged with a sun gear 11 and a ring gear 15. A multi-disc clutch 12 and a one-way clutch 13 are provided between the sun gear 11 and the carrier 10 and, furthermore, a multi-disc brake 19 is provided between the sun gear 11 and the overdrive housing or case 16 enclosing the overdrive means or the planetary gear mechanism.

The ring gear 15 of the overdrive means 2 is connected with an input shaft 23 of the reduction gear means 3. A multi-disc clutch 24 is provided between the input shaft 23 the intermediate shaft 29 while a multi-disc clutch 25 is provided between the input shaft 23 and a sun gear shaft 30. A multi-disc brake 26 is provided between the sun gear shaft 30 and the transmission case 18. The sun gear shaft 30 has a sun gear 32 integrally formed therein, said sun gear meshing with a plurality of first planetary pinions 34 which mesh in turn with a ring gear 35 supported by a carrier 33 thereby forming a first set of planetary gear mechanism while the sun gear 32 also meshes with a plurality of second planetary pinions 37 which mesh in turn with a ring gear 38 supported by a carrier 36, thereby forming a second set of planetary gear mechanism. The ring gear 35 of said first planetary gear mechanism is connected with the intermediate shaft 29, while the carrier 33 thereof is connected with the ring gear 38 of said second planetary gear mechanism. The combination of the carrier 33 and the ring gear 38 is connected with an output shaft 39. A multi-disc brake 27 and a one-way clutch 28 are provided between the carrier 36 of said second planetary gear mechanism and the transmission case 18.

The automatic transmission is controlled by the oil pressure control means explained hereinunder in a manner such that the aforementioned clutches and brakes are engaged or disengaged in order to accomplish various shift conditions among four forward speed stages including an overdrive stage and one rearward drive stage in accordance with the operating of a manual shift lever (not shown) and/or the balance of the engine output power and the vehicle speed.

Table 1 shows and operating condition of the clutches and brakes in various shift conditions.

TABLE 1

| Fric. Enga. Means<br>Shift Positions | CL<br>12 | CL<br>24 | CL<br>25 | BR<br>19 | BR<br>26 | BR<br>27 | ONE-WAY CL<br>13 | ONE-WAY CL<br>28 |
|---|---|---|---|---|---|---|---|---|
| Parking | 0 | X | X | X | X | 0 | — | — |
| Reverse | 0 | X | 0 | X | X | 0 | Lock | Lock |
| Neutral | 0 | X | X | X | X | X | — | — |
| FORWARD | | | | | | | | |
| D RANGE | | | | | | | | |
| 1st | 0 | 0 | X | X | X | X | Lock | Lock |
| 2nd | 0 | 0 | X | X | 0 | X | Lock | Over Run |
| 3rd | 0 | 0 | 0 | X | X | X | Lock | Over Run |
| O.D. | X | 0 | 0 | 0 | X | X | Over Run | Over Run |
| 2 RANGE | | | | | | | | |
| 1st | 0 | 0 | X | X | X | X | Lock | Lock |
| 2nd | 0 | 0 | X | X | 0 | X | Lock | Over Run |
| L RANGE | 0 | 0 | X | X | X | 0 | Lock | Lock |

Wherein 0 shows that the clutches or brakes are engaged and X shows that the clutches or brakes are disengaged.

FIG. 2 is a diagram of the oil pressure control means for operating the automatic transmission shown in FIG. 1, wherein an embodiment of the present invention is incorporated. The oil pumped up by an oil pump 41 from an oil reservoir 40 is supplied to a line pressure regulating valve 42 and generates a regulated line pressure $P_l$ in an oil passage 43. The line pressure is conducted through a passage 43a to a manual shift valve 44 while it is also conducted through passages 43b and 43c to a throttle pressure regulating valve 45 and a detent pressure regulating valve 46, respectively. The manual shift valve 44 is of the well known type having various shift positions such as parking (P), reverse (R), neutral (N), D Range (D), 2 Range (2) and L or 1 Range (L or 1). The line pressure supplied to the input port 47 of the manual shift valve selectively appears in the output ports 48-51 in accordance with the shift positions of the valve spool thereof. Table 2 shows where the oil pressure appears in the various shift positions.

TABLE 2

| PORT | SHIFT POSITION | P | R | N | D | 2 | L |
|---|---|---|---|---|---|---|---|
| 48 | | | | | 0 | 0 | 0 |
| 49 | | | | | | 0 | 0 |
| 50 | | | 0 | 0 | | | 0 |
| 51 | | | | 0 | | | |

The throttle pressure regulating valve 45 generates a throttle pressure at its output port 52, said pressure increasing in accordance with the amount the accelerating pedal is pushed or the opening of the throttle valve for the engine intake air. The output port 48 of the manual shift valve 44 is connected to the clutch 24 (forward clutch) by way of a passage 48a, and a passage 48b branched from a middle portion of the passage 48a is connected to the input port 54 of a governor valve 53. The governor valve is adapted to regulate the line pressure supplied to the port 54 in accordance with the vehicle speed and to generate a governor pressure $P_{go}$ at its output port 55, said governor pressure increasing as the vehicle speed increases.

56, 57 and 58 designate a 1-2 speed shift valve, a 2-3 speed shift valve and an overdrive control valve (3- overdrive shift valve), respectively. The 1-2 speed shift valve 56 comprises two valve elements 60 and 61 axially opposing to each other with inter-position of a compression coil spring 59. The valve element 60 is shifted between the lower shift position (as seen in the figure) such as shown by 56A and the upper shift position 56B in accordance with the balance of the sum of the downward driving forces applied by the spring 59 and the throttle pressure $P_{th}$ supplied to a port 62 through a passage 52a and the upward driving force applied by the governor pressure $P_{go}$ supplied to a port 63 through a passage 55a. Ports 64 and 65 of the 1-2 speed shift valve are supplied with the line pressure which appears at the output port 50 of the manual shift valve 44 when it is shifted to L Range, said line pressure being supplied through a low modulator valve 66. When the ports 64 and 65 are supplied with the pressure, the valve element 61 is shifted downward in the figure and compulsorily maintains the valve element 60 at the lower shift position 56A.

The 2-3 speed shift valve 57 similarly comprises two valve elements 68 and 69 axially opposing each other with interposition of a compression coil spring 67. The valve element 68 is shifted between the lower shift position such as shown by 57A and the upper shift position such as shown by 57B in accordance with the balance of the sum of the downward forces applied by the spring 67 and the throttle pressure $P_{th}$ supplied to a port 70 through a passage 52b and the upward force applied by the governor pressure $P_{go}$ supplied to a port 71 through a passage 55b. A port 72 of the 2-3 speed shift valve is supplied with the line pressure which appears at the output port 49 of the manual shift valve 44 when it is shifted to the 2 Range, said pressure being conducted through passages 49a and 49b to the port 72. When this pressure is supplied, the valve element 69 is shifted downward thereby compulsorily maintaining the valve element 68 at the lower shift position 57A.

The overdrive control valve 58 comprises a valve element 74 and a piston element 75 axially opposing each other with interposition of a compression coil spring 73. The valve element 74 is urged downward by the spring 73 while it is driven upward by the governor pressure $P_{go}$ supplied to a port 76 through a passage 55c when the governor pressure has increased beyond a predetermined value. The port 77 of the overdrive control valve is supplied with either the throttle pressure through a passage 52c and a shuttle valve 78, or the line pressure which appears at the output port 49 of the manual shift valve 44 when it is shifted to 2 or L range, said pressure being conducted through a passage 49c, a shuttle valve 79, a passage 49d and the shuttle valve 78, or the line pressure or a pressure produced from the line pressure in the below mentioned manner to be substantially lower than the throttle pressure, said pressure being conducted through a passage 43d, the shuttle valve 79, the passage 49d and the shuttle valve 78. When the throttle pressure supplied to the port 78a of the shuttle valve 78 is higher than the oil pressure supplied to the port 78b of the shuttle valve so that the throttle pressure is supplied to the port 77, the valve element 74 is shifted between the lower and upper shift positions 58A and 58B in accordance with the balance of the throttle pressure and the governor pressure. However, when the line pressure is supplied to the port 78b of the shuttle valve 78, a line pressure higher than the throttle pressure is introduced into the port 77, whereby the piston 75 is driven downward to the lower shift position such as shown by 58A, whereby the overdrive control valve 58 is compulsorily maintained at the lower shift position 58A regardless of the vehicle speed.

The port 80 of the 1-2 speed shift valve 56 is supplied with the line pressure through the passage 48b when the manual shift valve 44 is shifted to D range. When the 1-2 speed shift valve is in the upper shift position 56B, the line pressure supplied to the port 80 is transmitted to a port 81, wherefrom the pressure is conducted through a passage 48c to a port 82 of the 2-3 speed shift valve 57. When the 2-3 speed shift valve is in the lower shift position 57A, the pressure supplied to the port 82 is transmitted to a port 83, wherefrom the pressure is conducted through a passage 48d, to the brake 26 (second brake). When the 2-3 speed shift valve is in the upper shift position 57B, the pressure supplied to the port 82 is transmitted to a port 84, wherefrom the pressure is conducted through a passage 48e, a shuttle valve 85 and a passage 48f to the clutch 25 (reverse clutch). When the manual shift valve 44 is shifted to L range, the line pressure which appears at the output port 50 is conducted through the low modulator valve 66 to the ports 64 and 65 of the 1-2 speed shift valve 56, thereby driving the valve element 61 downward in the figure, wherefrom the pressure is conducted thorugh a port 86 and a passage 86a to the inside of the brake 27 (first-/reverse brake) to engage the brake. When the manual shift valve 44 is shifted to R range, the oil pressure which appears at the output port 51 of the manual shift valve is conducted through a passage 51a, ports 87 and 88 of the 1-2 speed shift valve and a passage 88a to the outside of the brake 27 thereby engaging the brake.

The port 89 of the overdrive control valve 58 is supplied with the line pressure through the passages 43b, 43c, and 43g. When the overdrive control valve is in the lower shift position 58A, the line pressure supplied to the port 89 is transmitted to a port 90, wherefrom the pressure is conducted through a passage 43e to the clutch 12 of the overdrive means. When the control valve is shifted to the upper shift position 58B, the oil pressure is transmitted from the port 89 to port 91, wherefrom the pressure is conducted through a passage 43f to the brake 19 of the overdrive means.

Figure 3:
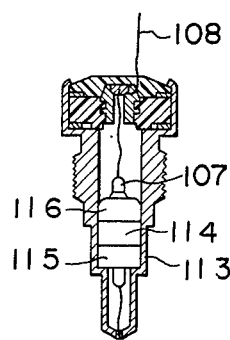

A throttling means 92 is provided at a middle portion of the passage 43d and, downstream of the throttling means the passage 43f further comprises a drain port 94 controlled by a valve element 93. The valve element 93 is actuated by a solenoid means 95. In the structure diagrammatically shown in the figure, the valve element 93 is constantly urged downward toward the position where it closes the port 94 by a spring not shown in the figure, while it is lifted upward in the figure to open the drain port 94 when the solenoid 95 is energized. The solenoid 95 is controlled by an electric circuit such as shown in the figure. In the circuit 96 is an electric source which may be the battery mounted in the vehicle. A transistor 97 turns the power circuit for the solenoid on and off, while the conductance of the transistor is controlled by the output of a logic amplifier 98. The resistance 99 regulates the solenoid current, and the resistance 100 regulates the transistor base current. 101 designates a switch for controlling the overdrive means, said switch being provided at a position convenient for operation by the hand or foot of the driver and being adapted to open when it is actuated and to be closed when not actuated. 102 designates a thermal switch which senses the temperature of the engine cooling water as a temperature representative of the warming up condition of the engine. The thermal switch may have a structure such as shown in FIG. 3. The thermal switch herein shown comprises a thermal sensitive portion 113 adapted to contact the cooling water of the engine, said thermo-sensitive portion including an assembly of three pieces, one being a thermoferrite piece 114, sandwiched by permanent magnet pieces 115 and 116. Through this assembly of pieces a reed switch 107 is mounted and it is electrically connected by lead wires as shown in the figure. The thermoferrite is magnetic at room temperature but it becomes non-magnetic when it is heated up to about 50° C. or more. Therefore, when the engine is cold, the reed switch 107 is closed (ON), whereas it opens (OFF) when the engine has been warmed up to about 50° C. This electric signal is delivered from a terminal 108.

Resistances 103, 104, 105 and 106 provide a potential divider. Designating the resistance value of these resistances by Ra, Rb, Rc and Rd, respectively, they are arranged so that the following condition is satisified $$Rb/(Ra+Rb) > Rd/(Rc+Rd)$$

In accordance with this electric circuit, the logic amplifier 98 provides a positive output only when both the manual switch 101 and the thermal switch 102 are opened, thereby making the transistor 97 conductive, whereas if at least one of the manual switch 101 and the thermal switch 102 is closed, the logic amplifier 98 provides a negative output thereby making the transistor 97 non-conductive. Table 3 shows the operating condition of the solenoid valve in accordance with the operating conditions of the manual switch and the thermal switch.

TABLE 3

| Solenoid Valve | Manual Switch Actuated | Not Actuated |
|---|---|---|
| Thermal Switch | (OFF) | (ON) |
| LOW TEMP | OFF | OFF |
| HIGH TEMP. | ON | OFF |

The oil pressure control means shown in FIG. 2 operates as follows.

D Range

When the manual shift valve 44 is shifted to D Range the line pressure appears only at the port 48, said pressure being supplied to the clutch 24. If the vehicle is standing or running at a low speed under this condition, the governor pressure generated by the governor valve 53 is so low that the 1-2 speed shift valve 56, the 2-3 speed shift valve 57 and the over-drive control valve 58 are generally shifted to the lower shift positions 56A, 57A and 58A, respectively. Therefore, the pressure supplied through the passage 48b is blocked at the port 80, whereby the reverse clutch 25 and the second brake 26 connected with the subsequent passages are not supplied with the oil pressure. On the other hand, the oil pressure conducted through the passage 43g to the port 89 of the overdrive control valve 58 is supplied therethough to the clutch 12 of the overdrive means. In this condition, therefore, the overdrive means is locked and the transmission is in the 1st speed stage.

In the normal operating condition, when the vehicle speed gradually increases from the above mentioned condition, the governor pressure gradually increases, and when the governor pressure has attained a predetermined value, the 1-2 speed shift valve 56 is shifted to the upper shift position 56B, whereupon the line pressure appears at the port 81 and is conducted therefrom through the ports 82 and 83 of 2-3 speed shift valve 57 and passages 48d to the second brake 26. Therefore, the transmission is shifted to the 2 speed stage.

When the vehicle speed further increases, the 2-3 speed shift valve 57 is also shifted to the upper shift position 57B, whereupon the pressure is transmitted from the port 82 to the port 84, wherefrom the pressure is conducted through the passage 48e to the reverse clutch 25. Therefore, the transmission is shifted to the 3rd speed stage.

When the vehicle speed further increases, the overdrive control valve 58 is also shifted to the upper shift position 58B, whereupon the pressure supplied to the port 89 is now transmitted to the port 91, wherefrom the pressure is supplied to the brake 19 to engage it. Therefore, the overdrive means is actuated and the overdrive condition is attained.

Although the changing over operation of the transmission has been explained in the above with regard to the case wherein the vehicle speed gradually increases, it should of course be noted that the changing over of the transmission is effected depending upon the balance of the governor pressure and the throttle pressure acting on the valve element of individual shift valves and, therfore, the changing over point varies not only in accordance with the vehicle speed but also in accordance with the amount the accelerating pedal is pushed. Conversely, when the vehicle speed gradually decreases from a high speed, the overdrive control valve 58, the 2-3 speed shift valve 57 and the 1-2 speed shift valve 56 are successively shifted from 58B to 58A, 57B to 57A and 56B to 56A, respectively, thereby accomplishing the corresponding change-over of the transmission speed stage.

However, even when the vehicle speed is low, if the accelerating pedal is correspondingly very slightly pushed, the overdrive control valve 58 having the valve element 74 which is directly supplied with the governor pressure and the throttle pressure at its opposite ends can be shifted to the upper shift position 58B in accordance with the balance of the two pressures, both being at a low level, thereby causing the driving condition that the overdrive means is actuated at a low vehicle speed. If this low speed overdrive condition happens before the engine is warmed up, there occurs the aforementioned problems such as the increase of the fuel consumption and the increase of the emission of noxious components, particularly NOx. This trouble is definitely avoided by the oil pressure control means of the present invention such as shown in FIG. 2. When the engine is not yet warmed up to a predetermined temperature, the thermal switch 102 is in the ON state, whereby the solenoid 95 is de-energized regardless of the operating condition of the manual switch 101, thereby closing the drain port 94 with the valve element 93. Under this condition, the line pressure conducted through the passage 43d is further transmitted through the shuttle valve 79 and the passage 49d to the shuttle valve 78. Since the line pressure is definitely higher than the throttle pressure, the line pressure biases the ball 78c of the shuttle valve 78 downward in the figure and is supplied to the port 77 of the overdrive control valve 58. Under this condition, therefore, it never happens that the overdriven control valve is shifted to the upper shift position 58B and thus the overdrive means is positively maintained in the locked condition.

By contrast, when the engine has been warmed up to a predetermined temperature while the manual switch 101 is actuated, the solenoid 95 is energized thereby retracting the valve element 93 from the drain port 94 which is then opened. Under this condition due to the throttling means 92 provided upstream of the drain port 94, the oil pressure is not substantially transmitted to the portion of the passage 43d located downstream of the drain port 94 and including the shuttle valve 79 and 78, whereby the ball 78c of the shuttle valve 78 is shifted upward in the figure by the throttle pressure supplied to port 78a thereby introducing the throttle pressure into the port 77 of the overdrive control valve 58 which is then operated in the usual manner depending upon the throttle pressure and the governor pressure.

2 Range

When the manual shift valve 44 is shifted to 2 range, the line pressure appears at the port 48 as well as at the port 49, wherefrom the pressure is conducted through the passages 49a and 49b to the port 72 of the 2-3 speed shift valve 57 while the pressure is also conducted through the passage 49c, the shuttle valve 79, the passage 49d and the shuttle valve 78 to the port 77 of the overdrive control valve 58, thereby compulsorily maintaining these valves at the lower shift positions 57A and 58A, respectively. Under this condition, therefore, the overdrive means is positively maintained in the locked condition, while the transmission operates either in the 1st speed stage or the 2nd speed stage.

L Range

When the manual shift valve 44 is shifted to L Range, the line pressure also appears at the output port 50, wherefrom the pressure is conducted through the low modulator valve 66 to the ports 64 and 65 of the 1-2 speed shift valve 56 thereby compulsorily maintaining the valve at the lower shift position 56A. Under this condition, the transmission is fixed at the 1st speed stage.

From the foregoing, it will be appreciated that the present invention positively prevents the automatic transmission from being shifted to the highest speed stage, particularly the overdrive stage, before the engine is warmed up to a predetermined temperature, thereby avoiding the problem of increasing the fuel consumption and the emission of noxious components in the exhaust gases.

Although the invention has been shown and described with respect to a preferred embodiment thereof, it should be understood by those skilled in the art that various changes and omission of the form and detail thereof may be made therein without departing from the scope of the invention.

I claim:

1. An oil pressure control means for an automatic transmission having a fluid torque converter and a speed shift gear means including a speed shift gear mechanism and a plurality of friction engaging means, said oil pressure control means comprising a source of oil pressure, a line pressure regulating valve which generates a line pressure from the oil pressure of said source, a throttle pressure regulating valve which generates a throttle pressure corresponding to the throttle opening, a governor valve which generates a governor pressure corresponding to the vehicle speed, a manual shift valve for shifting speed ranges, and a plurality of speed shift valves which change over the supply of oil pressure to said friction engaging means of said speed shift gear means depending upon the balance of said throttle pressure and said governor pressure, a thermo-sensitive means including a thermo-sensitive element for sensing the engine temperature and connected to make one of said speed shift valves which establishes the highest speed stage incapable of establishing that highest speed stage when the engine temperature is below a predetermined value and to make said one speed shift valve capable of establishing the highest stage when the engine temperature is above a predetermined value.

2. The oil pressure control means of claim 1, wherein said thermo-sensitive means includes an oil passage control means adapted to be conductive for the line pressure therethrough when the engine temperature is below a predetermined value and to be substantially interceptive for the line pressure thereacross when the engine temperature is above a predetermined value, and an oil passage change over means which supplies the line pressure conducted through said thermo-sensitive control means to said one speed shift valves which establishes the highest speed stage in lieu of the throttle pressure when said oil passage control means is conductive.

3. The oil pressure control means of claim 1, wherein said one speed shift valve is an overdrive control valve which is constantly supplied with the line pressure and changes over the line pressure between two output systems, one effecting the positive lock up of an overdrive means while the other effects the operation of the overdrive means.

4. The oil pressure control means of claim 2, wherein said thermo-sensitive means comprises a drain port which opens a middle portion of said oil passage conducting the line pressure and a solenoid valve which selectively opens or closes said drain port.

5. The oil pressure control means of claim 4, wherein said solenoid valve opens said drain port when energized, said oil pressure control means further comprising an electric circuit connected to be controlled by said thermal-sensitive element so that said circuit is opened so as not to energize said solenoid valve when the engine temperature is below a predetermined value.

6. The oil pressure control means of claim 5, further comprising a manual switch incorporated in said electric circuit so as to open said electric circuit when it is not actuated by the driver.

7. The oil pressure control means of claim 6, wherein said electric circuit includes a logic circuit connected to close said electric circuit so as to energize said solenoid valve when said thermal-sensitive element is detecting an engine temperature above a predetermined value and said manual switch is actuated.

* * * * *